United States Patent
Wenger et al.

(10) Patent No.: US 9,065,351 B2
(45) Date of Patent: Jun. 23, 2015

(54) DC/DC CONVERTER

(75) Inventors: Christoph Wenger, Korntal-Muenchingen (DE); Christof Maluck, Wiernsheim (DE); Albert Geiger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 824 days.

(21) Appl. No.: 13/060,105

(22) PCT Filed: Jul. 24, 2009

(86) PCT No.: PCT/EP2009/059547
§ 371 (c)(1),
(2), (4) Date: May 9, 2011

(87) PCT Pub. No.: WO2010/020519
PCT Pub. Date: Feb. 25, 2010

(65) Prior Publication Data
US 2011/0204713 A1 Aug. 25, 2011

(30) Foreign Application Priority Data

Aug. 19, 2008 (DE) .......................... 10 2008 041 341

(51) Int. Cl.
| | | |
|---|---|---|
| *B60L 1/00* | (2006.01) | |
| *H02M 3/335* | (2006.01) | |
| *B60L 3/00* | (2006.01) | |
| *H02G 3/00* | (2006.01) | |
| *H02M 1/36* | (2007.01) | |

(52) U.S. Cl.
CPC ...................................... *H02M 1/36* (2013.01)

(58) Field of Classification Search
CPC ............ Y02T 10/7005; Y02T 10/7216; B60L 2210/10; H02M 3/1582
See application file for complete search history.

(56) References Cited

U.S. PATENT DOCUMENTS

| | | | |
|---|---|---|---|
| 1,600,337 A | 9/1926 | Johnson | |
| 6,445,599 B1 | 9/2002 | Nguyen | |
| 7,304,461 B2* | 12/2007 | Watanabe et al. | 323/282 |
| 2003/0098678 A1 | 5/2003 | Haraguchi et al. | |
| 2004/0078662 A1 | 4/2004 | Hamel et al. | |
| 2004/0112320 A1* | 6/2004 | Bolz et al. | 123/179.28 |
| 2008/0013345 A1* | 1/2008 | Takeshita et al. | 363/21.01 |
| 2009/0257257 A1* | 10/2009 | Adragna et al. | 363/65 |

FOREIGN PATENT DOCUMENTS

| | | |
|---|---|---|
| CN | 1421985 | 6/2003 |
| JP | 2003-230268 | 8/2003 |
| JP | 2006-230163 | 8/2006 |

OTHER PUBLICATIONS

International Search Report for PCT/EP2009/059547, dated Sep. 14, 2009.

\* cited by examiner

*Primary Examiner* — Jared Fureman
*Assistant Examiner* — Aqeel Bukhari
(74) *Attorney, Agent, or Firm* — Kenyon & Kenyon

(57) ABSTRACT

A DC/DC converter for providing an output voltage includes: a connected DC voltage transformer; a supply voltage input for providing a first supply potential and a second supply potential to the DC voltage transformer; a potential point which is connectable to the second supply potential as a function of an activation state of the DC voltage transformer; an output capacitor which is connected to an output connection and to the potential point, and which is chargeable to the output voltage by activating the DC voltage transformer, and at which an output potential is tappable. The output voltage is provided between the output potential and the second supply potential.

11 Claims, 2 Drawing Sheets

DC/DC CONVERTER

FIELD OF THE INVENTION

The present invention relates to DC/DC converters, in particular DC/DC converters having capacitors which are permanently connected to the supply voltage of the converter.

BACKGROUND INFORMATION

A connected DC/DC converter for use in the automotive field may be designed with a storage inductor which according to a control, for example a pulse width modulation signal, is short-circuited between a supply potential and a ground potential, using a switch which switches to ground. After the short circuit is interrupted, the charged storage inductor causes current to flow into an output capacitor, which provides an output voltage. The level of the output voltage may be set as a function of the pulse duty factor of the pulse width modulation signal which is used to activate the switch which switches to ground.

To improve the electromagnetic compatibility (EMC), in particular to reduce the conducted emissions on the supply voltage lines and the output lines, LC filters are generally necessary in each case. The output capacitor as well as the capacitors of the input-side and output-side LC filters are connected to the supply voltage and the output voltage, respectively, so that these capacitors divert the interferences, i.e., changes in the supply voltage level from high supply potential to ground potential. When electrolytic capacitors are used this has the disadvantage that, on account of the permanent direct connection of the DC/DC converter to the vehicle power supply, high effective currents result due to the ripple in the supply voltage. The electrolytic capacitors must therefore be designed for these high effective currents, which requires use of expensive capacitors.

Ceramic capacitors, which may be used instead of electrolytic capacitors, may fracture in the event of malfunction. These ceramic fractures result in short circuits between layers in the ceramic capacitors, as the result of which fault currents and power losses in the capacitors may occur.

Since in conventional DC/DC converters the capacitors are generally situated between the high supply potential and the ground potential, permanent current flows may arise overall which have an adverse effect on the components of the DC/DC converter which are used, and which subject the power supply network, in the case of a motor vehicle, the vehicle power supply, to unnecessary load.

SUMMARY

Example embodiments of the present invention provide a connected DC/DC converter in which parasitic current flows may be largely avoided, in particular when the DC/DC converter is not actively controlled to provide an output voltage.

According to a first aspect, a DC/DC converter is provided for supplying an output voltage. The DC/DC converter includes the following:
- a connected DC voltage transformer;
- a supply voltage input for providing the DC voltage transformer with a first supply potential and a second supply potential;
- a potential point which is connectable to the second supply potential as a function of an activation state of the DC voltage transformer;
- an output capacitor which is connected to an output connection and to the potential point, and which is rechargeable by activating the DC voltage transformer to the output voltage, and at which an output potential is tappable, the output voltage being provided between the output potential and the second supply potential.

The above DC voltage transformer is based on the concept of separating the second supply potential, for example a ground potential, from the potential point when the DC voltage transformer is in the switched-off state. The potential point of the DC voltage transformer, to which the output capacitor and possibly additional capacitors in the DC voltage transformer are connected, is not connected to the supply ground potential until the DC voltage transformer is activated for generating an output voltage. In this manner, in the switched-off state of the DC voltage transformer, parasitic currents, for example due to ripples in the supply voltages or because of short circuits or leakage current paths within the capacitors, may be prevented from causing current flows within the DC voltage transformer, resulting in loads on, or disturbances of, the supply voltage network.

In addition, one or multiple filter capacitors may be provided which is/are connected on the input side and/or the output side to the DC voltage transformer and to the potential point.

According to example embodiments, the potential point may be connected to the second supply potential via a switch, such as a semiconductor switch or a mechanical relay, for example, so that the second supply potential is applied to the potential point as a function of the switching state of the switch or the potential point may be floating or have a defined high-resistance connection to the second supply potential.

Furthermore, a control unit may be provided for generating a control signal for the DC voltage transformer, thus activating the latter for generating the output voltage.

The control unit may be connected to the switch in order to provide an activation signal which indicates that the DC voltage transformer is activated within a period of time.

In addition, a control unit may be provided which is connected to a fault current detection unit in order to detect information in the deactivated state of the DC voltage transformer concerning a fault current via the potential point, and to activate the DC voltage transformer on the basis of the fault current information.

According to example embodiments, a polarity reversal protection unit may be provided, which is connected to the switch in order to provide the switch with the second supply potential as a function of the algebraic sign of the ratio of the first and the second supply potentials.

The DC voltage transformer may also have a direct current path which in the inactive state of the DC voltage transformer allows direct current to flow from the first supply potential to the output connection. In other words, the DC voltage transformer has no voltaically separating electrical components between the first supply potential and the output connection. This allows an electrical device to be operated with the supply voltage even when the DC voltage transformer is inactive, i.e., not activated by the control unit.

According to a further aspect, a method is provided for operating a DC/DC converter for supplying an output voltage. The method includes:
- providing a first supply potential and a second supply potential to a supply voltage input of a connected DC voltage transformer;
- providing the output voltage between an output potential and the second supply potential, the output potential being tappable at an output capacitor which is connected to an output connection and to a potential point, the output capacitor being chargeable to the output voltage by activating the DC voltage transformer, and connecting the potential point to the second supply potential as a function of an activation state of the DC voltage transformer.

According to a further aspect, use of the above DC/DC converter is provided in a motor vehicle having a consumer, in particular a starter for an internal combustion engine, and having an electrically operable device, the control unit activating the DC/DC converter to connect the potential point to the second supply potential when switching-on of the consumer is imminent.

Example embodiments of the present invention are explained in greater detail below with reference to the appended drawings.

DETAILED DESCRIPTION

Figure 1:
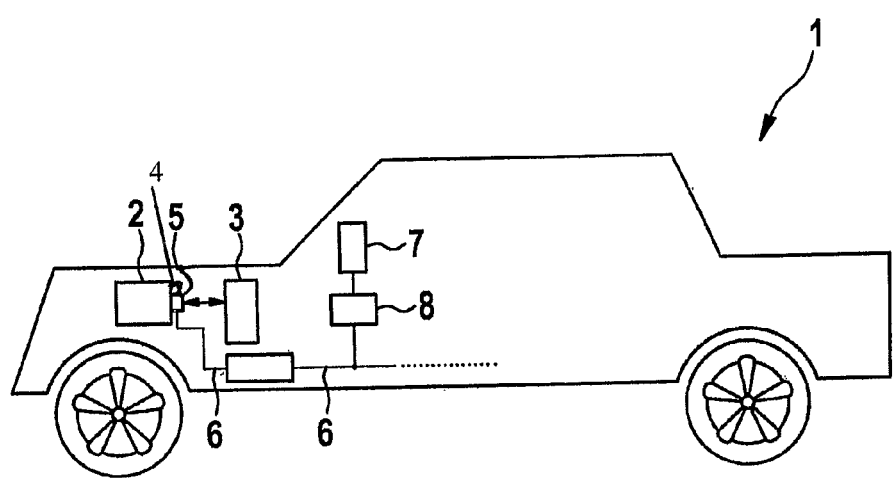
FIG. 1 shows a schematic representation of a motor vehicle having a start-stop system and a device which is operated via a DC/DC converter.

FIG. 1 shows a motor vehicle 1 having an internal combustion engine 2. Internal combustion engine 2 is operated in a customary manner. In addition, an engine start-stop unit 3 is provided for carrying out engine management, in which internal combustion engine 2 is switched off and switched back on, depending on the driving mode. Internal combustion engine 2 is switched on by activating a starter 4 which is operated via a battery 5. Battery 5 is connected to starter 4 via vehicle power supply 6.

Significant voltage dips in the vehicle power supply 6 occur in particular when internal combustion engine 2 is restarted. In particular sensitive electronic devices, for example an infotainment device 7, such as a navigation system, etc., which are designed to remain in continuous operation even when internal combustion engine 2 is restarted, must therefore be supplied via a controlled DC/DC converter 8. Thus, with the aid of DC/DC converter 8 it is ensured that during start-up of internal combustion engine 2, applications which are sensitive to fluctuations in the supply voltage may be operated in a safeguarded vehicle power supply during the starting process, i.e., in a part of the vehicle power supply which is protected from voltage dips which may occur when the starter is activated.

Figure 2:
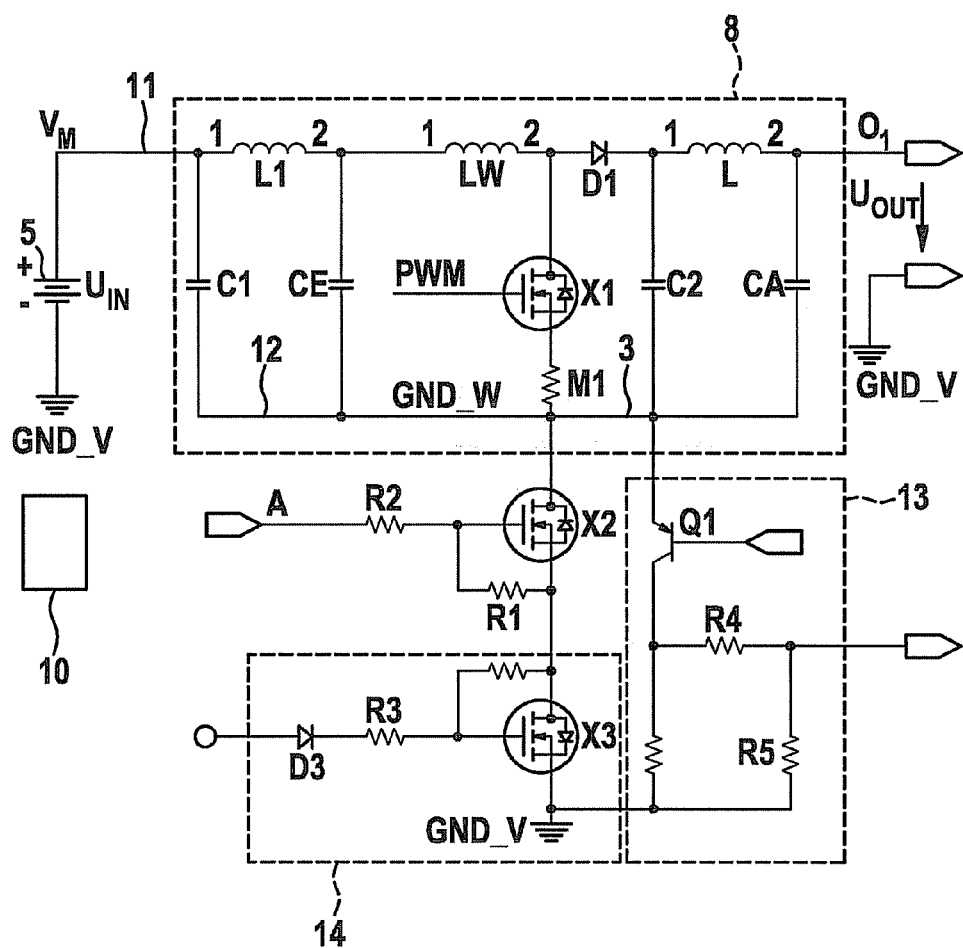
FIG. 2 shows a schematic representation of a circuit design of the DC/DC converter, having a switching-off option for the ground potential of the DC/DC converter.

FIG. 2 illustrates such a DC/DC converter 8, which is provided with an input voltage $U_{in}$ from a voltage source, for example battery 5 in vehicle 1 via vehicle power supply 6. Input voltage $U_{in}$ is between a high supply potential $V_M$, which is applied via a supply potential line 11, and a supply ground potential GND_V.

High supply potential $V_M$ is filtered in an input LC filter, which has a first capacitor C1 and a first coil L1. First capacitor C1 is connected via a first connection to supply potential line 11, which carries high supply potential $V_M$, and is connected via a second connection to a converter ground potential GND_W on a converter ground potential line 12. First coil L1 is connected via a first connection to supply potential line 11, and via a second connection to an input capacitor CE, and is connected via a first connection to a converter coil LW. A second connection of input capacitor CE is connected to converter ground potential GND_W.

A second connection of converter coil LW is connected to a first connection of a field effect transistor X1, the drain connection, for example, and to a first connection (anode connection) of a freewheeling diode D1, which components LW, X1, and D1 form a DC voltage transformer. A second connection (source connection) of first field effect transistor X1 is connected, directly or via a measuring shunt Ml, to converter ground potential GND_W. A control connection (gate connection) of first field effect transistor X1 is connected to a control unit 2 which emits a pulse width-modulated control signal PWM to the gate connection of first field effect transistor X1 in order to set the pulse duty factor of the pulse width-modulated control signal PWM, as a function of the current through first field effect transistor X1, which is measured with the aid of measuring shunt Ml, for example, such that output voltage $U_{out}$ of the DC/DC converter is regulated to the desired value.

A second connection, the cathode connection of freewheeling diode 1, is connected to a first connection of a second capacitor C2, and to a first connection of a second coil L2. A second connection of second capacitor C2 is connected to converter ground potential GND_W, while a second connection of second coil L2 is connected to the output of the DC/DC converter and to a first connection of an output capacitor CA.

A second connection of output capacitor CA is connected to converter ground potential GND_W.

The DC/DC converter circuit has capacitors which are connected between high supply potential $V_M$ and converter ground potential GND_W. When there are ripples in the supply voltage, which may be caused, for example, by the generator under appropriate load conditions in the vehicle power supply, a current flows through the capacitors which results in an additional load on vehicle power supply 6 which provides the supply voltage. In addition, short circuits within capacitors C1, CW, C2, CA may result in parasitic currents and further load on vehicle power supply 6.

To avoid such a load at least in the switched-off state of DC/DC converter 1, the DC/DC converter circuit has a converter ground potential GND_W which is separate from supply ground potential GND_V of vehicle power supply 6, and which is provided in the DC/DC converter only when the latter is activated, i.e., when first field effect transistor X1 is activated according to a pulse width-modulated control signal PWM in order to provide an output voltage $U_{out}$. If the first field effect transistor is switched off, in the ideal case there is no potential on the converter ground potential line 12; i.e., converter ground potential line 12 is floating. In practice, the connection between potential GND_W and potential GND_V has a defined high resistance when a field effect transistor is blocked, and thus prevents an impermissible load on the vehicle power supply and the control device.

Converter ground potential GND_W is substantially provided with the aid of a second field effect transistor X2. A first connection (drain connection) of second field effect transistor X2 is connected to converter ground potential GND_W, while a second connection (source connection) of second field effect transistor X2 is connectable to supply ground potential GND via a third field effect transistor X3. The second connection of second field effect transistor X2 is connected to a control connection (gate connection) of second field effect transistor X2 via a first resistor R1. The control connection (gate connection) is also connected via a second resistor R2 to an activation signal connection, via which an activation signal A may be received. Activation signal A indicates when the DC/DC converter should be switched on. Such an activation signal is delivered, for example, directly before starter 5 is started, for example, at a given period of time, for example 15 ms, before starter 5 is started. This allows the connection of supply ground potential GND_V to converter ground potential line 12 via through-connected second field effect transistor X2 in order to provide the DC/DC converter with converter ground potential GND_W, and thus with battery voltage $U_{in}$, via converter ground potential line 12.

The second connection of second field effect transistor X2 is connected via a first connection (source connection) of third field effect transistor X3 to supply ground potential GND_V, which is applied to the second connection (drain connection) of third field effect transistor X3. At the control connection (gate connection) of third field effect transistor X3, via a second diode D2 and a third resistor R3, an internal voltage which is a function of the battery voltage is present which is greater than supply ground potential GND_V, in order to switch third field effect transistor X3 through when the second connection of third field effect transistor X3 is at a ground potential. Second diode D2 and third field effect transistor X3 represent a polarity reversal protection unit 14 for protecting the entire circuit from polarity reversal of the battery, and is thus used as polarity reversal protection. When, in the event of a polarity reversal, high supply potential $V_M$ is connected to supply ground potential GND_V and supply ground potential GND_V is at a high potential, third field effect transistor X3 provides blocking, and second field effect transistor X2 is not able to switch the supply ground potential through to converter ground potential line 12.

In addition, a fault current detector 13 is provided, in which converter ground potential line 3 has a transistor Q1 and a voltage divider formed by a fourth resistor R4 and a fifth resistor R5. Before starting the activation of second field effect transistor X2 with the aid of activation signal A, it is determined with the aid of fault current detector 6 whether capacitors C1, CE, C2, CA provide sufficient insulation between high supply potential $V_M$ and supply ground potential GND_V. Only when the fault current does not exceed a defined threshold value, control unit 10 provides activation signal A to second field effect transistor X2 in order to connect converter ground potential GND_W to supply ground potential GND_V. The value of the fault current is detected by control unit 10 by tapping a voltage at the voltage divider formed by fourth and fifth resistors R4, R5.

Providing a converter ground potential GND_W of DC/DC converter 8 which may be switched off, allows a protected converter ground potential GND_W to be generated which is connected to all capacitors C1, CE, C2, CA of DC/DC converter 8. When field effect transistor X2 is blocked, this prevents an effective current load or fault currents as the result of defective capacitors, or fluctuations in the supply voltages of the vehicle power supply, when DC/DC converter 8 is not activated. Shortly before the DC/DC converter is activated, second field effect transistor X2 is switched on, converter ground potential GND_W being connected to supply ground potential GND_V with the lowest possible resistance.

Switching off the converter ground potential path (by using field effect transistors X2 and X3) is advantageous in particular when the time periods during which DC/DC converter 8 is active are in the range of a few seconds, which is the case for start-stop applications, for example. During these brief time periods, fairly high effective currents result in only slight heating of capacitors. Even when a malfunction occurs in the ceramic capacitors which causes a low-resistance short circuit due to metal migration, a thermal overload does not immediately result when second field effect transistor X2 is temporarily switched on.

When a consumer is switched on, it is not necessary for DC/DC converter 8 to be notified in advance via an activation signal. A detection unit might also be provided which detects a voltage dip in the vehicle power supply and generates an appropriate activation signal, so that the DC/DC converter is switched on in the event of a voltage dip. A voltage dip is unavoidable. However, the voltage dip is limited in time.

What is claimed is:

1. A DC/DC converter for providing an output voltage, comprising:
a connected DC voltage transformer;
a DC supply voltage input configured to provide the DC voltage transformer with a first supply potential and a second supply potential, wherein the second supply potential is a supply ground potential of a power supply, and wherein a DC input voltage is represented by a difference between the first supply potential and the second supply potential;
a potential point which is (i) on a converter ground potential line and (ii) selectably connectable to the second supply potential as a function of an activation state of the DC voltage transformer, wherein the potential point is selectably connected to the supply ground potential of the power supply only when the DC voltage transformer is in an activated state;
an output capacitor connected to an output connection and to the potential point, wherein the output capacitor is configured to be selectably charged to the output voltage by activation of the DC voltage transformer, and wherein an output potential is selectively tapped at the output capacitor, the output voltage being provided between the output potential and the second supply potential.

2. The DC/DC converter according to claim 1, further comprising at least one filter capacitor connected on at least one of (a) an input side and (b) an output side to the DC voltage transformer and to the potential point.

3. The DC/DC converter according to claim 1, wherein the potential point is selectably connected to the second supply potential via a switch, so that: (a) the second supply potential is applied to the potential point in a first switching state of the switch; and (b) in a second switching state of the switch, the potential point one of (i) is floating and (ii) has a defined high-resistance connection to the second supply potential.

4. The DC/DC converter according to claim 3, further comprising a control unit adapted to generate a control signal for the DC voltage transformer to activate the DC voltage transformer to generate the output voltage.

5. The DC/DC converter according to claim 4, wherein the control unit is connected to the switch in order to provide an activation signal which indicates that the DC voltage transformer is activated within a period of time.

6. The DC/DC converter according to claim 4, wherein the control unit is connected to a fault current detection unit in order to detect information in a deactivated state of the DC voltage transformer concerning a fault current via the potential point, and to activate the DC voltage transformer as a function of fault current information.

7. The DC/DC converter according to claim 3, further comprising a polarity reversal protection unit connected to the switch in order to provide the switch with the second supply potential as a function of an algebraic sign of a ratio of the first supply potential and the second supply potential.

8. The DC/DC converter according to claim 1, wherein the DC voltage transformer includes a direct current path which in an inactive state of the DC voltage transformer allows direct current to flow from the first supply potential to the output connection.

9. A method for operating a DC/DC converter for providing an output voltage, comprising:
- providing a first supply potential and a second supply potential to a DC supply voltage input of a connected DC voltage transformer, wherein the second supply potential is a supply ground potential of a power supply, and wherein a DC input voltage is represented by a difference between the first supply potential and the second supply potential;
- providing the output voltage between an output potential and the second supply potential, the output potential being selectively tapped at an output capacitor connected to an output connection and to a potential point which is on a converter ground potential line, the output capacitor being chargeable to the output voltage by activating the DC voltage transformer; and
- selectably connecting the potential point to the second supply potential as a function of an activation state of the DC voltage transformer, wherein the potential point is selectably connected to the supply ground potential of the power supply only when the DC voltage transformer is in an activated state.

10. A motor vehicle, comprising:
- a consumer;
- a DC/DC converter as recited in claim 1;
- an electrically operable device; and
- a control unit adapted to activates the DC/DC converter to connect the potential point to the second supply potential when switching-on of the consumer is imminent.

11. The motor vehicle according to claim 10, wherein the consumer is arranged as a starter for an internal combustion engine of the motor vehicle.

* * * * *